US009705619B2

(12) United States Patent
House et al.

(10) Patent No.: US 9,705,619 B2
(45) Date of Patent: *Jul. 11, 2017

(54) APPARATUS AND METHOD FOR SYNCHRONOUS HARDWARE TIME STAMPING

(71) Applicant: GarrettCom, Inc., Fremont, CA (US)

(72) Inventors: Lee Harrell House, San Jose, CA (US); Ming-Hsin Kuo, Milpitas, CA (US); Dileep Sivasankaran, Fremont, CA (US); Frank S. Madren, Los Gatos, CA (US)

(73) Assignee: GARRETTCOM, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,520

(22) Filed: Oct. 6, 2014

(65) Prior Publication Data

US 2015/0023365 A1    Jan. 22, 2015

Related U.S. Application Data

(63) Continuation of application No. 13/347,400, filed on Jan. 10, 2012, now Pat. No. 8,855,108.

(51) Int. Cl.
*H04J 3/06* (2006.01)
*H04L 12/56* (2006.01)
*H04L 12/875* (2013.01)
*H04L 12/54* (2013.01)

(52) U.S. Cl.
CPC ............ *H04J 3/0605* (2013.01); *H04L 12/56* (2013.01); *H04L 47/56* (2013.01)

(58) Field of Classification Search
CPC ....... H04L 45/00; H04L 47/10; H04L 49/351; H04L 29/0653; H04L 29/06; H04L 12/2684; H04L 43/14; H04J 3/0661; H04J 3/065; H04J 3/0655; H04N 21/8547
USPC ................. 370/356, 389–394, 503, 508–516
See application file for complete search history.

(56) References Cited

U.S. PATENT DOCUMENTS

| | | | |
|---|---|---|---|
| 5,280,586 A * | 1/1994 | Kunz | G06F 13/4022 370/434 |
| 6,445,700 B1 | 9/2002 | Yusa et al. | |
| 7,496,109 B1 | 2/2009 | Gupta et al. | |
| 8,270,920 B2 * | 9/2012 | Chan | H04L 27/36 455/151.3 |
| 8,582,581 B2 * | 11/2013 | Kletti | H04L 69/08 370/395.5 |

(Continued)

*Primary Examiner* — Xavier Szewai Wong
(74) *Attorney, Agent, or Firm* — Daniel Rose; Foley & Lardner LLP

(57) ABSTRACT

Methods and apparatus that may be used to provide timestamps to physical layer devices are provided. One method includes obtaining a time value from a clock associated with a physical layer device that is communicatively coupled to a primary data packet switch. The method further includes adding a processing time to the time value to generate a timestamp and transmitting the timestamp to a multiplexer circuit. The method further includes writing the timestamp in parallel from the multiplexer circuit to a plurality of external physical layer devices that are communicatively coupled to a secondary data packet switch and are located external to a housing of the secondary data packet switch.

17 Claims, 4 Drawing Sheets

(56) References Cited

U.S. PATENT DOCUMENTS

| | | | |
|---|---|---|---|
| 8,855,108 B2* | 10/2014 | House | H04J 3/0605 |
| | | | 370/356 |
| 2002/0080771 A1 | 6/2002 | Krumel | |
| 2003/0219007 A1* | 11/2003 | Barrack | H04L 29/06 |
| | | | 370/352 |
| 2005/0094466 A1* | 5/2005 | Archer | G01T 1/026 |
| | | | 365/222 |
| 2008/0151799 A1* | 6/2008 | Yousef | H04H 20/426 |
| | | | 370/311 |
| 2011/0255556 A1* | 10/2011 | Landais | H04N 21/234318 |
| | | | 370/474 |
| 2011/0305307 A1* | 12/2011 | Wang | H04J 3/0667 |
| | | | 375/362 |

* cited by examiner

APPARATUS AND METHOD FOR SYNCHRONOUS HARDWARE TIME STAMPING

RELATED APPLICATIONS

This application is a continuation of co-pending U.S. application Ser. No. 13/347,400, entitled "Apparatus and Method for Synchronous Hardware Time Stamping," filed Jan. 10, 2012, the entirety of which is herein incorporated by reference.

BACKGROUND

The present disclosure relates generally to data networking apparatus. More particularly, embodiments of the present disclosure relate to hardware timestamping in data networking apparatus.

SUMMARY

One embodiment of the disclosure relates to a data packet switching apparatus configured for timestamping at a plurality of physical layer devices. The apparatus includes a primary switch having a plurality of serial ports and a secondary switch having a serial port and a plurality of internal physical layer devices that are located within a housing of the secondary switch. The serial port of the secondary switch is coupled to one of the serial ports of the primary switch. The secondary switch comprises a communication interface configured to connect the secondary switch with a plurality of external physical layer devices that are located outside of the housing of the secondary switch.

Another embodiment of the disclosure relates to a method of timestamping for a packet switching apparatus. The method includes obtaining a time value from a clock associated with a physical layer device that is communicatively coupled to a primary data packet switch. The method further includes adding a processing time to the time value to generate a timestamp and transmitting the timestamp to a multiplexer circuit. The method further includes writing the timestamp in parallel from the multiplexer circuit to a plurality of external physical layer devices that are communicatively coupled to a secondary data packet switch and are located external to a housing of the secondary data packet switch.

Another embodiment relates to a packet switching apparatus. The apparatus includes a primary packet switch integrated circuit and a secondary packet switch integrated circuit that is connected to the primary packet switch integrated circuit. The secondary packet switch integrated circuit is configured to transmit one or more signals to a plurality of physical layer devices that are not integrated within the secondary packet switch integrated circuit. The apparatus further includes a controller configured to obtain a time value from a clock associated with a physical layer device that is communicatively coupled to the primary packet switch integrated circuit. The controller is configured to generate a timestamp based on the time value and a processing time. The apparatus further includes a multiplexer configured to receive the timestamp and to transmit the timestamp in parallel to the plurality of external physical layer devices.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
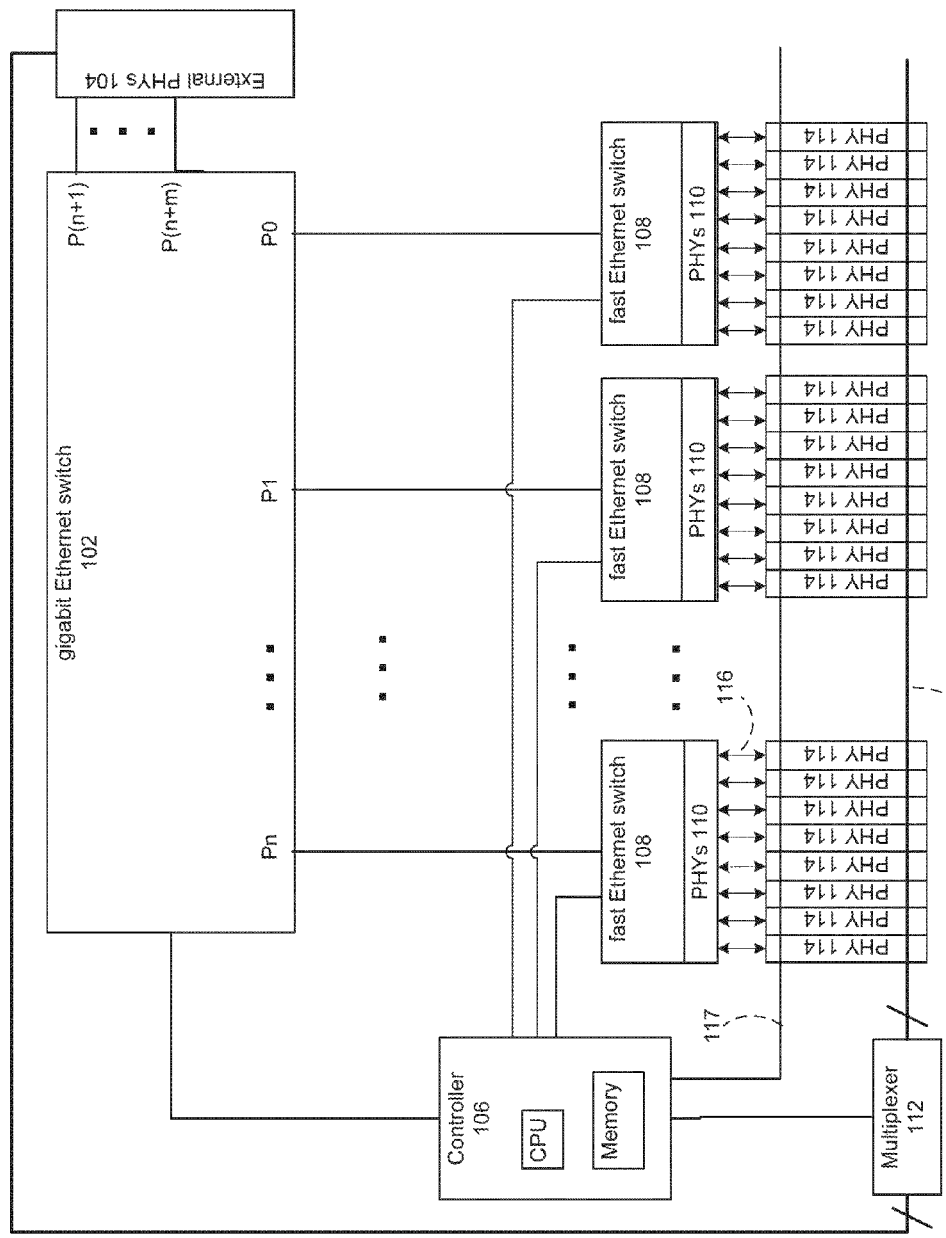
FIG. 1 is a block diagram illustrating a data networking apparatus in accordance with an exemplary embodiment.

The IEEE 1588 standard (IEEE: Institute of Electrical and Electronic Engineers) defines a precision time protocol. IEEE 1588 makes a very high synchronizing accuracy possible. However, the hardware circuit requirements for achieving said synchronizing accuracy are not precisely specified in the standard.

Software only solutions to support IEEE 1588 may not be viable due to the lack of accuracy of many such solutions. Hence, various exemplary embodiments of the present disclosure provide a hardware circuit-based solution to provide support for synchronizing and/or timestamping (e.g., under IEEE 1588) within a data networking apparatus.

Various problems and challenges exist in providing such a hardware solution. For example, supporting the IEEE 1588 timing protocol requires timestamping at the system ingress. There are limited options for providing hardware-based support for such timestamping. Some options include: i) obtaining a switching IC (integrated circuit) that includes support for IEEE 1588, ii) obtaining physical layer device (PHY) components that include support for IEEE 1588, or iii) developing a field programmable gate array (FPGA) that provides support for IEEE 1588.

Each of these options has problems and challenges. Regarding the switching ICs, there are currently minimal switching ICs that provide support for IEEE 1588, and the switching ICs that do provide such support are either very large or very small. There is a current absence of switching ICs that provide support for IEEE 1588 on both gigabit and fast Ethernet interfaces at "one rack unit" level densities. Regarding the PHY components, there are currently minimal PHY components with integrated IEEE 1588 support. And, of those components, there are limitations on the type of interface between the PHY component and the switching IC. Finally, the FPGA solutions are very expensive to develop or implement in commercial solutions.

Various exemplary embodiments disclosed herein provide advantageous solutions (e.g., hardware-based solutions) to providing timestamping and synchronization support (e.g., under IEEE 1588) within a data packet switching apparatus. In some embodiments, at least one secondary switch (e.g., an integrated circuit, or IC) may be connected to a primary switch (e.g., an IC). The primary switch may be a gigabit Ethernet switch IC, such as, for example, a Marvell 88E6185, which is commercially available from Marvell Semiconductor, Inc. of Santa Clara, Calif. The secondary switch may be a fast Ethernet switch IC, such as, for example, a Marvell 88E6095F or a Marvell 88E6097, also commercially available from Marvell Semiconductor, Inc. In some embodiments, multiple secondary switches (e.g., including the same or different IC's, produced by the same or different manufacturers, etc.) may be connected to one primary switch. By connecting multiple secondary switches to a primary switch, a substantially higher port count is provided. For example, up to ten secondary switches with eight fast Ethernet ports each may be connected to the primary switch so as to provide 80 fast Ethernet ports, and each port may be supportable with precision timestamping.

Various exemplary embodiments provided herein may allow for the use of disparate switches from different suppliers to be integrated into a single solution which supports precision timestamping on both gigabit Ethernet ports and fast Ethernet ports. Normally, such disparate switches would not operate together in a manner that delivers a coherent synchronized timestamping solution.

While various exemplary embodiments provided herein may be used in the implementation of synchronization support under IEEE 1588, it should be appreciated that the present disclosure is not limited to the implementation of synchronization under IEEE 1588 and may additionally or alternatively be utilized in conjunction with other applications and systems.

FIG. 1 is a block diagram depicting a data networking apparatus 100 in accordance with an exemplary embodiment. As shown, the networking apparatus 100 includes a gigabit Ethernet switch 102, PHY devices 104, controller 106, multiple fast Ethernet switches 108, multiplexer 112, and dedicated PHY devices 114. In other exemplary embodiments, the networking apparatus 100 may include more, less, or different components than those illustrated in FIG. 1.

A PHY device is a physical layer device. A PHY device may include circuitry to perform functions relating to the physical layer of a multi-layer networking stack. A PHY device may include, for example, physical media attachment (PMA) circuitry and/or physical coding sublayer (PCS) circuitry. In some exemplary embodiments, PHY devices may include Ethernet port interfaces (e.g., for fast Ethernet and/or gigabit Ethernet) that may be used to connect external networking devices (e.g., other switches, computing devices, etc.) to a networking apparatus such as networking apparatus 100. In some embodiments, PHY devices may be integrated into networking apparatus 100 (e.g., may be included within a housing of networking apparatus 100).

The gigabit Ethernet switch 102 may be considered to be a "primary" switch, and the fast Ethernet switches 108 may be considered to be "secondary" switches. The secondary switches may be utilized to increase the port capacity of the networking apparatus 100. Otherwise, the port capacity of the networking apparatus 100 may be limited by the number of ports of the primary switch.

As shown in FIG. 1, the gigabit Ethernet switch 102 may have several high-speed serial ports connected to the PHY devices 104 (e.g., PHY devices that are located external, or outside, of a housing of gigabit Ethernet switch 102) and several other high-speed serial ports connected to the fast Ethernet switches 108. In the exemplary embodiment shown, the serial ports P0 through Pn of the gigabit Ethernet switch 102 are each connected to a serial port of a corresponding fast Ethernet switch 108. The serial ports P(n+1) through P(n+m) of the gigabit Ethernet switch 102 are connected to the PHY devices 104. These PHY devices 104 are connected to the gigabit Ethernet switch 102 (e.g., via high speed serial lines) and provide gigabit Ethernet interfaces (e.g., integrated as a part of the networking apparatus 100) which allow connectivity to external networking devices.

In some implementations, each fast Ethernet switch 108 may include internal PHY devices 110 (e.g., contained or located within a housing of the fast Ethernet switch 108). Each internal PHY device 110 may be associated with a corresponding serial port. In accordance with an exemplary embodiment of the disclosure, the fast Ethernet switch 108 may be configured such that one or more of the internal PHY devices 110 may be bypassed. Rather than using a bypassed internal PHY device 110, the apparatus may be configured such that the Ethernet signal is output to a dedicated PHY device 114 that is external to the fast Ethernet switch 108 (e.g., located outside of the fast Ethernet switch 108). These dedicated PHY devices 114 provide fast Ethernet interfaces. Utilizing dedicated PHY devices 114 to provide fast Ethernet connectivity to external devices may allow additional functions and/or performance achievements to be included in the network apparatus 100, such as IEEE 1588 timestamping. In accordance with one embodiment, connections 116 between a fast Ethernet switch 108 and associated dedicated PHY devices 114 may be implemented utilizing a reduced media independent interface, or RMII (e.g., utilizing a connection including less than 16 pins, such as 6 to 10 pins). In some embodiments, one or more fast Ethernet switches 108 may not include internal PHY devices.

The controller 106 includes a CPU (central processing unit) and memory. The controller 106 is arranged such that the CPU may execute computer-readable instructions that are stored in memory or other computer-readable medium. The CPU may include any type of general purpose or special purpose processor (e.g., FPGA, CPLD, ASIC, SDS, etc.) The memory may include any type of computer-readable medium (e.g., RAM, ROM, hard drive, removable storage, flash, volatile and/or non-volatile, etc.). In accordance with an exemplary embodiment, the gigabit Ethernet switch 102 and fast Ethernet switches 108 are each connected to the controller 106. The controller 106 may be communicatively coupled to a multiplexer circuit 112 to transmit precision timestamp data to the multiplexer circuit 112. The controller 106 may be configured with a bus 117 to transmit control signals to the dedicated PHY devices 114. In accordance with one embodiment, the bus 117 may comprise a management data input/output interface bus, or MDIO bus.

The multiplexer circuit 112 has a plurality of outputs configured to send precision timestamp data via parallel connections 118 to associated dedicated PHY devices 114 that are connected to the fast Ethernet switches 108. The multiplexer circuit 112 may additionally or alternatively have outputs to transmit precision timestamp data to the PHY devices 104 which may be connected to the gigabit Ethernet switch 102. By using the multiplexer circuit 112, the precision timestamp data may be received synchronously, or nearly synchronously, by these PHY devices. In accordance with one embodiment, the timestamp data may be received by the PHY devices using a general purpose input/output interface.

In some embodiments, the controller 106 may be configured to coordinate timing to allow simultaneous or near-simultaneous writing to the dedicated PHY devices 114. The dedicated PHY devices 114 (and/or PHY devices 104) may forward current timing values to the controller 106. The controller 106 may be configured to compare each of the timing values to a master value and establish offsets that exist within the system (e.g., offsets for each dedicated PHY device 114). In some embodiments, the controller 106 may be configured to increment or decrement timing at different devices to assure that all devices are substantially synchronized. A bulk write circuit within the controller may allow all devices to receive control messages (e.g., over an MDC/MDIO interface) at once. A signal from one slot in the system (e.g., a pulse per second signal) may allow synchronization of the devices, and the devices can use the signal as a timing event to forward current timing values to the controller 106 for validation and adjustment.

Figure 2:
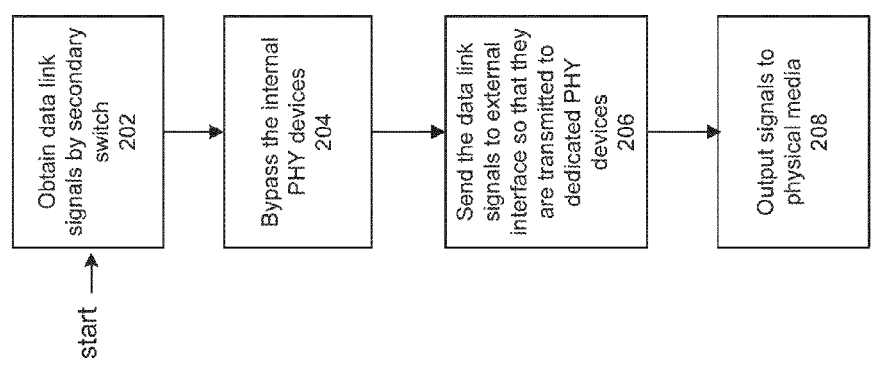
FIG. 2 is a flow chart of a process for operating secondary switches in accordance with an exemplary embodiment.

FIG. 2 is a flow chart showing a process 200 of operating one or more secondary switches in a networking apparatus in accordance with an exemplary embodiment of the disclosure. The secondary switches are connected to ports of a primary switch. In the apparatus 100 shown in FIG. 1, the secondary switches are the fast Ethernet switches 108, and the primary switch is the gigabit Ethernet switch 102.

Data link signals may be obtained by the secondary switch (202). The data link signals may be Ethernet signals, for example. In some embodiments, rather than sending these data link signals to internal PHY devices (e.g., to the internal PHYs 110 in FIG. 1), these internal PHY devices are bypassed (204). For example, a test mode intended for debugging the secondary switch may be utilized to bypass the internal PHY devices. The data link signals may instead be sent to an external interface so that they are transmitted to dedicated PHY devices (e.g., to the dedicated PHY devices 114 in FIG. 1) which are external to the secondary switch (206). The dedicated PHY devices may process the data link signals and output signals to physical transmission media (208).

Figure 3:
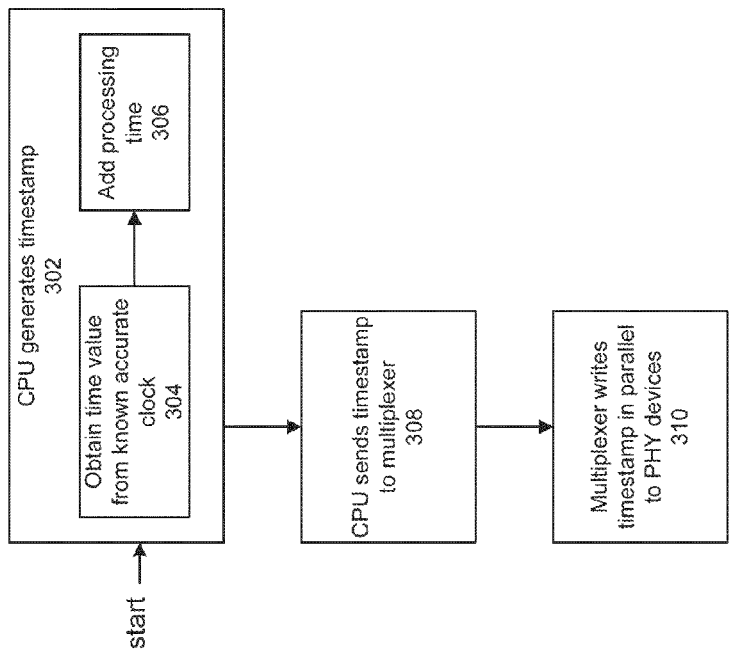
FIG. 3 is a flow chart of a process for distributing a timestamp to multiple PHY devices in accordance with an exemplary embodiment.

FIG. 3 is a flow chart showing a process 300 of generating and distributing a timestamp in accordance with an exemplary embodiment of the disclosure. The timestamp may be very precise. In some embodiments, the timestamp may include, for example, several bytes for a "seconds" field and several bytes for a "nanoseconds" field.

A CPU may generate a timestamp (302). In the apparatus 100 of FIG. 1, for example, the CPU is a processor in the controller 106. In one implementation, the timestamp may be generated by obtaining a time value from a clock (e.g., a reference clock believed to be accurate) (304) and adding a processing time (306). The reference clock may be obtained, for example, from a PHY interface using a software implementation in accordance with the IEEE 1588 standard. The processing time may be determined by way of empirical measurements. The processing time may correspond to the time it takes to read the time value from the reference clock in the PHY device, add the delay (due to the processing time) to the time value to update it, write the updated time value (e.g., the timestamp) to the other synchronized PHY devices in the system, and/or perform any other functions that the apparatus may perform.

The CPU may then send the timestamp to a multiplexer (308). The multiplexer may write the timestamp (e.g., in a parallel and synchronous manner) to PHY devices (e.g., external PHY devices) (310). In the apparatus 100 of FIG. 1, the multiplexer is the multiplexer 112 that is connected in parallel to the dedicated PHY devices 114. The dedicated PHY devices 114 are in turn connected to the fast Ethernet switches 108. The multiplexer 112 may additionally or alternatively be connected in parallel to the PHY devices 104 that are connected to the gigabit Ethernet switch 102.

Figure 4:
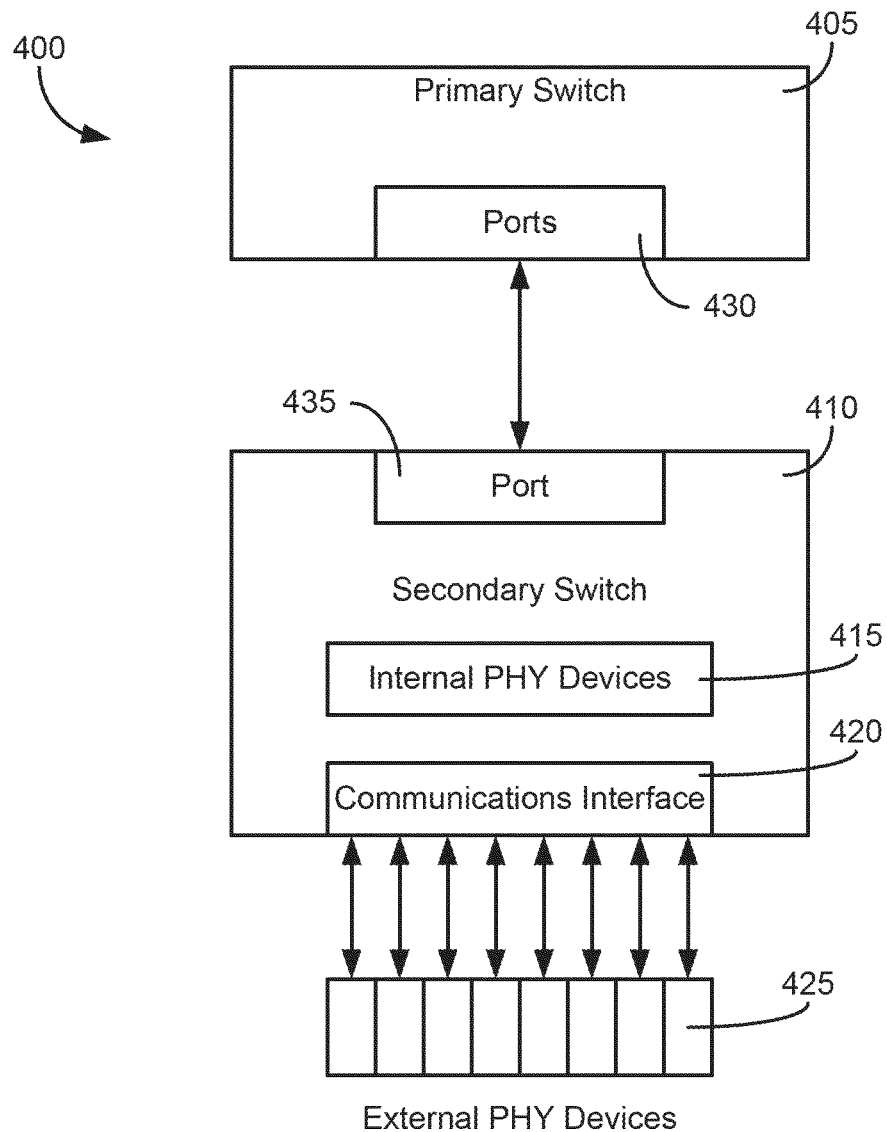
FIG. 4 is a block diagram of a data networking apparatus in accordance with an exemplary embodiment.

FIG. 4 illustrates a block diagram of a data networking apparatus 400 according to an exemplary embodiment. The apparatus 400 includes a primary switch 405 that has a communication interface including a plurality of ports 430 (e.g., serial ports). The apparatus 400 also includes at least one secondary switch 410 having a port 435 (e.g., a serial port). The primary switch 405 and secondary switch 410 may be communicatively coupled to one another through a connection between one of the ports 430 and port 435. In one embodiment, the primary switch 405 is a gigabit Ethernet switch and the secondary switch 410 is a fast Ethernet switch. In some embodiments, various components of apparatus 400 may be used in the implementation of one or more operations of processes 200 and/or 300.

The secondary switch 410 may include a plurality of internal physical layer (PHY) devices 415 that are located within a housing of the secondary switch 410. The secondary switch 410 may include a communication interface 420 configured to communicatively couple or connect the secondary switch 410 with a plurality of external physical layer (PHY) devices 425. The external PHY devices 425 may be located outside of the housing of the secondary switch 410. In some embodiments, the secondary switch 410 may be configured to receive signals (e.g., from the primary switch 405) and provide the signals to the communication interface 420 for transmission to the external PHY devices 425 without providing the signals to the internal PHY devices 415 (i.e., bypass the internal PHY devices 415).

In some exemplary embodiments, the apparatus 400 may include a controller that is configured to transmit control signals that may be used to configure registers in the primary switch 405, secondary switch 410, and/or the external PHY devices 425. The apparatus 400 may include a multiplexer configured to receive an input signal from the controller and provide output signals to the external PHY devices 425 (e.g., parallel timestamp signals transmitted through an output interface of the multiplexer). In some embodiments, the multiplexer may additionally or alternatively be configured to transmit signals to external PHY devices that are connected to the primary switch 405.

Figure 5:
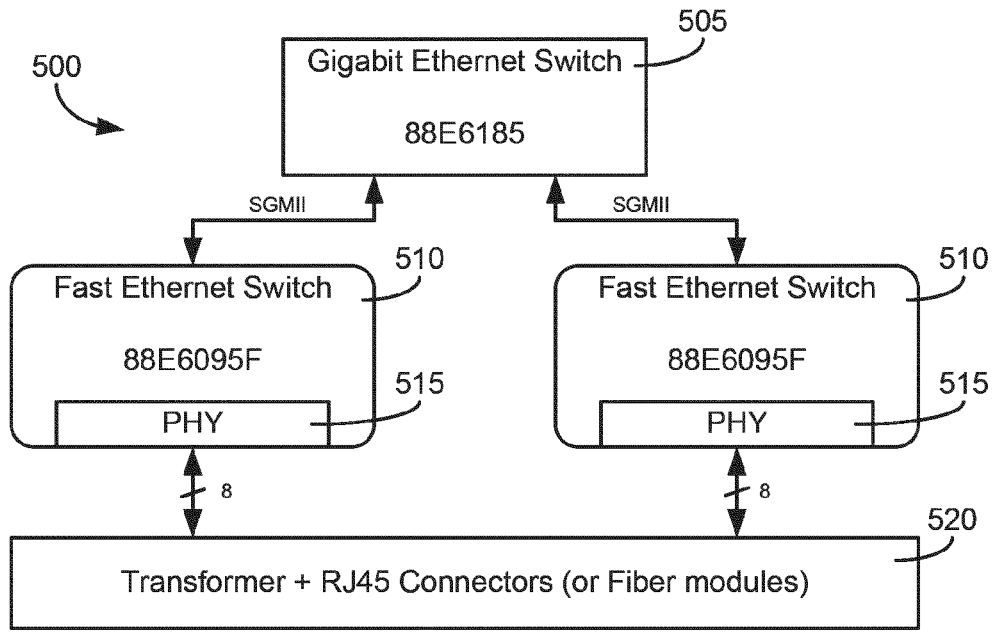
FIG. 5 is a block diagram illustrating a data networking apparatus in accordance with another exemplary embodiment.
Figure 6:
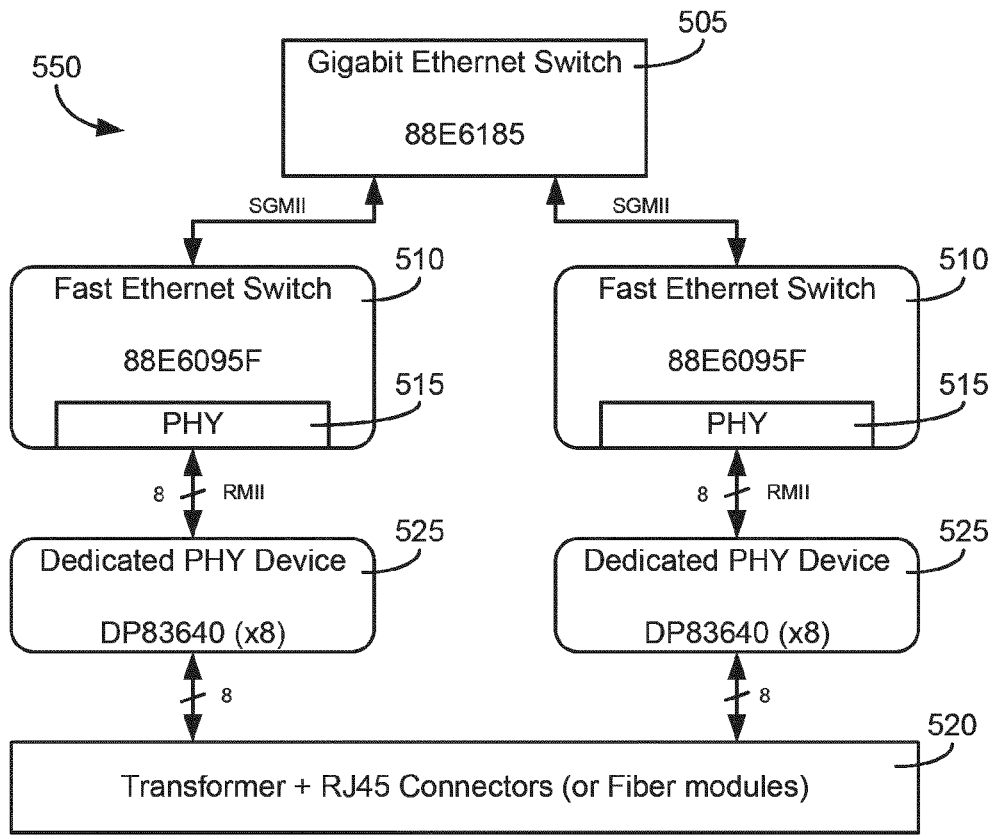
FIG. 6 is a block diagram illustrating a data networking apparatus in accordance with another exemplary embodiment.

Referring now to FIGS. 5 and 6, block diagrams of networking apparatus 500 and 600, respectively, are shown according to exemplary embodiments. The illustrated exemplary embodiments provides references to specific components that may be used to implement various features described in the present disclosure. Other exemplary embodiments may utilize additional, fewer, and/or different components to achieve various features described herein; all such modifications are contemplated within the present disclosure.

Referring specifically to FIG. 5, apparatus 500 includes a gigabit Ethernet switch 505 and two fast Ethernet switches 510. The gigabit Ethernet switch 505 is communicatively connected to the fast Ethernet switches 510 through a high speed serial interface. In the illustrated exemplary embodiment, the gigabit Ethernet switch 505 is a Marvell 88E6185 gigabit Ethernet switch IC, which is commercially available from Marvell Semiconductor, Inc. of Santa Clara, Calif. The fast Ethernet switches 510 may be Marvell 88E6095F or Marvell 88E6097F fast Ethernet switch ICs, also commercially available from Marvell Semiconductor, Inc. The serial connection between the Ethernet switches may be a Serial Gigabit Media Independent Interface (SGMII). The fast Ethernet switches 510 may include internal PHY devices 515. For example, the Marvell 88E6095F and 88E6097F switches include 8-port internal embedded fast Ethernet 10/100M PHY devices. The internal PHY devices 515 may be connected directly to external interfaces 520 such as Ethernet interfaces (e.g., transformers and RJ45 connectors) and/or fiber modules for transmitting data signals to connected external networking devices.

The functions and performance of apparatus 500 may be limited in part by the capabilities and/or characteristics of the internal PHY devices 515. For example, the internal PHY devices of the Marvell 88E6095F and 88E6097F switches do not support the IEEE 1588 standard.

One method of overcoming the limitations of internal PHY devices of switches (e.g., to provide support for IEEE 1588) is to bypass the internal PHY devices and instead include dedicated (e.g., external) PHY devices. FIG. 6 illustrates a networking apparatus 600 that utilizes the same components as apparatus 500 of FIG. 5 and also utilizes dedicated PHY devices 525. In the illustrated exemplary embodiment, the dedicated PHY devices 525 are DP83640 PHY devices that are commercially available from National Semiconductor of Santa Clara, Calif. In some embodiments, the dedicated PHY devices 525 may be configured to support IEEE 1588, and utilizing the dedicated PHY devices 525 may enable the network apparatus 600 to support IEEE 1588. The fast Ethernet switches 510 are communicatively coupled to the dedicated PHY devices 525 through a connection (e.g., hardwired connection) such as a RMII interface. The fast Ethernet switches 510 may be placed into a specific mode (e.g., an RMII interface mode) configured to bypass the internal PHY devices 515 and transmit data directly to the external PHY devices 525. The external PHY devices 525 in turn may transmit the data to external interfaces 520 for transmission to connected external devices.

In order to fully support IEEE 1588 throughout apparatus 600, all components and interconnections utilized to transmit data may be configured to support IEEE 1588. A gigabit transceiver that supports IEEE 1588, such as the Marvell 88E1322 gigabit transceiver, also commercially available from Marvell Semiconductor, Inc., may be used to connected the gigabit Ethernet switch 505 to the fast Ethernet switches 510 through SGMII. A multiplexer and/or other logic devices (e.g., IC devices) may be used to control and/or synchronize some or all of the switch and PHY devices to avoid Management Data Clock (MDC) line and/or Management Data I/O (MDIO) line contentions.

Implementations of the subject matter and the operations described in this specification can be carried out using digital electronic circuitry, in computer software or firmware embodied in a tangible and/or non-transitory medium, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more tangible computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of timestamping for a packet switching apparatus, the method comprising:
   obtaining a time value from a clock associated with a physical layer device that is communicatively coupled to a primary data packet switch;
   adding a processing time to the time value to generate a timestamp;
   transmitting the timestamp to a multiplexer circuit; and
   writing the timestamp in parallel from the multiplexer circuit to a plurality of physical layer devices that are communicatively coupled to a secondary data packet switch and are located external to a housing of the secondary data packet switch, the plurality of physical layer devices comprising dedicated physical layer devices that are associated with the secondary data packet switch;
   wherein the secondary data packet switch comprises a plurality of internal physical layer devices that are located within the housing of the secondary data packet switch, and wherein the secondary switch is configured to receive one or more signals and to provide the one or more signals to the physical layer devices located external to the housing of the secondary data packet switch without providing the one or more signals to the internal physical layer devices.

2. The method of claim 1, wherein the plurality of external physical layer devices further comprises physical layer devices that are connected to the primary data packet switch.

3. The method of claim 1, wherein the primary data packet switch is a gigabit Ethernet switch, and the secondary data packet switch is a fast Ethernet switch.

4. The method of claim 1, wherein adding the processing time to the time value to generate a timestamp further comprises obtaining the processing time based on a sum of (i) a time to obtain the time value, (ii) a time to add the processing time to the time value, and (iii) a time to transmit the timestamp to the multiplexer circuit.

5. The method of claim 1, wherein the plurality of physical layer devices are connected to the secondary packet switch integrated circuit via a first communications interface of each physical layer device; and
   wherein writing the timestamp in parallel from the multiplexer circuit to the plurality of physical layer devices further comprises transmitting the timestamp via a second communications interface of each physical layer device.

6. The method of claim 5, wherein the second communications interface of each physical layer device comprises a general purpose input/output interface.

7. The method of claim 5, wherein the first communications interface of each physical layer device comprises an Ethernet interface.

8. A method of timestamping for a packet switching apparatus, the method comprising:
   obtaining a time value from a clock associated with a physical layer device that is communicatively coupled to a primary data packet switch;
   adding a processing time to the time value to generate a timestamp, the processing time obtained based on a sum of (i) a time to obtain the time value, (ii) a time to add the processing time to the time value, (iii) a time to transmit the timestamp to the multiplexer circuit, and (iv) a time to write the timestamp from the multiplexer circuit to a plurality of physical layer devices;
   transmitting the timestamp to a multiplexer circuit; and
   writing the timestamp in parallel from the multiplexer circuit to the plurality of physical layer devices that are communicatively coupled to a secondary data packet switch and are located external to a housing of the secondary data packet switch, the plurality of physical layer devices comprising dedicated physical layer devices that are associated with the secondary data packet switch.

9. A packet switching apparatus comprising:
   a primary packet switch integrated circuit;
   a secondary packet switch integrated circuit that is connected to the primary packet switch integrated circuit, wherein the secondary packet switch integrated circuit is configured to transmit one or more signals to a plurality of physical layer devices that are not integrated within the secondary packet switch integrated circuit;
   a controller configured to obtain a time value from a clock associated with a physical layer device that is communicatively coupled to the primary packet switch integrated circuit, wherein the controller is configured to generate a timestamp based on the time value and a processing time; and a multiplexer configured to receive the timestamp and to transmit the timestamp in parallel to the plurality of physical layer devices;

wherein the plurality of physical layer devices comprises a plurality of external physical layer devices, wherein the secondary packet switch integrated circuit comprises a plurality of internal physical layer devices that are located within a housing of the secondary packet switch integrated circuit, and wherein the secondary packet switch integrated circuit is configured to bypass the internal physical layer devices when transmitting the one or more signals to the plurality of external physical layer devices.

10. The apparatus of claim 9, further comprising:

a second plurality of physical layer devices connected to the primary packet switch integrated circuit, wherein the multiplexer is further configured to transmit the timestamp in parallel to the second plurality of physical layer devices.

11. The apparatus of claim 9, wherein the primary packet switch integrated circuit is a gigabit Ethernet switch, and the secondary switch is a fast Ethernet switch.

12. The apparatus of claim 9, wherein the secondary switch is configured to transmit the one or more signals to the plurality of physical layer devices through a reduced media independent interface.

13. The apparatus of claim 9, wherein the multiplexer is configured to transmit the timestamp through a general purpose input/output interface.

14. The packet switching apparatus of claim 9, wherein the controller is further configured to obtain the processing time based on a sum of (i) a time to obtain the time value, (ii) a time to add the processing time to the time value, and (iii) a time to transmit the timestamp to the multiplexer circuit.

15. The packet switching apparatus of claim 9, wherein the controller is further configured to receive current timing values from the plurality of physical layer devices, establish timing offsets for each physical layer device, and transmit one or more control messages to physical layer devices to increment or decrement timing at each said physical layer device to eliminate the timing offset for each said physical layer device.

16. The packet switching apparatus of claim 9, wherein a first portion of the physical layer devices provide Ethernet interfaces at a first transmission rate, wherein a second portion of the physical layer devices provide Ethernet interfaces at a second transmission rate, and wherein the first portion and second portion of the physical layer devices are synchronized via the transmitted timestamp.

17. A packet switching apparatus comprising:

a primary packet switch integrated circuit;

a secondary packet switch integrated circuit that is connected to the primary packet switch integrated circuit, wherein the secondary packet switch integrated circuit is configured to transmit one or more signals to a plurality of physical layer devices that are not integrated within the secondary packet switch integrated circuit;

a controller configured to obtain a time value from a clock associated with a physical layer device that is communicatively coupled to the primary packet switch integrated circuit, wherein the controller is configured to generate a timestamp based on the time value and a processing time, the processing time obtained based on a sum of (i) a time to obtain the time value, (ii) a time to add the processing time to the time value, (iii) a time to transmit the timestamp to the multiplexer circuit, and (iv) a time to write the timestamp from the multiplexer circuit to the plurality of physical layer devices; and a multiplexer configured to receive the timestamp and to transmit the timestamp in parallel to the plurality of physical layer devices.

* * * * *